Patented Jan. 30, 1945

2,368,384

UNITED STATES PATENT OFFICE 2,368,384

YEAST PRODUCT AND METHOD OF PRESERVING GLUTATHIONE CONTAINED THEREIN

Roland W. Selman, Jr., Kansas City, Kans., and Homer S. Myers, Kansas City, Mo., assignors to Campbell-Taggart Research Corporation, Kansas City, Mo., a corporation of Missouri No Drawing. Application February 1, 1943, Serial No. 474,338

12 Claims. (Cl. 195—57)

This invention relates to a yeast product and a method of preserving glutathione contained therein and more particularly to the method of preserving glutathione during drying of dried brewer's yeast, for example, to maintain the original glutathione content in the yeast product and stabilize said glutathione.

Flour of the character used in bakeries contains protein-splitting enzymes of the papain type, some of which are active and others inactive. The inactive form may be activated by the addition of certain sulfhydryl compounds and in the manufacture of bread and like products this flour proteinase is effective in softening the dough. The softening is believed to be due to an hydrolysis of the "gluten" and tends to render the dough more plastic and apparently more fluid. One of the preferred compounds effecting such activation is glutathione.

It is the principal object of the present invention to provide a product having a rich, stable glutathione content suitable for use in bakeries and the like for softening dough, or in other processes in which glutathione might be advantageously utilized, as, for instance for the inhibition of vitamin C oxidation in the manufacture of citrus fruit juices.

Glutathione is a naturally occurring tri-peptide containing a labile sulfhydryl group, hence it is susceptible to oxidation. Glutathione is obtainable in pure crystalline form, but deteriorates very rapidly in dried yeast and most natural products and if the oxidation of the glutathione continues it is unsatisfactory for use. Substantially pure or crystalline glutathione is very expensive, and while many efforts have been made to separate this chemical in the pure state, the result and cost of the product are not satisfactory.

Dried brewer's yeast is a rich source of supply for glutathione, since about one-fourth a pound of yeast yields approximately one gram of glutathione and the low cost of the yeast has made it desirable as a source of glutathione, for example in the baking industry where yeast having a high available glutathione content may be used directly in the bread dough or other baking mixes to secure the proper glutathione content in said dough. In order for the glutathione content of yeast to be suitable and available for use in bakeries, the yeast cell walls must be ruptured to release the cell constituents and this invention relates to the preservation of glutathione in yeast having ruptured cell walls.

Glutathione in dried yeast having ruptured cells also oxidizes and deteriorates very rapidly and the many attempts to preserve the glutathione content or retard deterioration thereof have not been successful. The yeast has been coated with oil to protect it from the air, and has also been stored in carbon dioxide, however, such methods are not fully effective.

We have found that there is a relation between the pH value of the yeast and the deterioration of the glutathione. We have also found that the deterioration varies with the moisture content of the dried yeast.

Other objects of the present invention are, therefore, to modify the pH value of yeast having a high available glutathione content in such a manner that the pH value is approximately 6 or less; to provide for adding an organic or inorganic acid to a yeast slurry for adjusting the pH value of the slurry prior to drying of the yeast; to add sulfuric acid to a yeast slurry for reducing the pH value of the suspension of disintegrated yeast cells to a range of preferably approximately from 4 to 5 for preserving glutathione; to preserve the glutathione content of the dried yeast product by reducing the moisture content of said dried yeast to below 6½% by weight of moisture; to provide a dried yeast product having a pH value preferably approximately in the range control of 4 to 5 for preserving the glutathione therein; to control the temperature of a yeast slurry during pre-heating to eliminate loss of glutathione due to relatively high temperatures; to provide a yeast product of the character noted that may be stored indefinitely in a dry state with relatively small loss of glutathione; and to provide a convenient, economical and efficient method of preparing said product.

In accomplishing these and other objects of the present invention, we have found that a yeast product having a high and stable content of glutathione may be prepared by forming a yeast slurry of live brewer's yeast, said slurry preferably containing approximately 15% solids. The slurry may be placed in a tank and heated to a predetermined temperature. We have found that when the slurry is heated to a temperature of not greater than 45° C. there is no appreciable loss of glutathione over extended periods of time, whereas at a temperature of 70° C. very appreciable amounts of glutathione are destroyed in an hour. Hence, for the purpose of our invention it is advisable that the yeast slurry either should not be heated to such a temperature as to destroy its glutathione, or the glutathione should be protected against oxidation at a higher preheating temperature.

After the yeast slurry is preheated to a predetermined temperature (preferably 45° C. or less) it is injected continuously into a conventional drying machine consisting typically of one or more rotating steam heated rolls. The yeast slurry is applied on the rolls in a thin film, dried by the heat of the steam heated rolls and scraped off. The dried yeast is then generally pulverized to obtain the finished product. In some instances it is possible to draw the yeast slurry directly into the drier from the vat without preheating.

It will be recognized that, for the purposes of this invention, the dried glutathione containing product may be obtained equally well by the spray drying process and its modifications.

Yeast contains about 1% glutathione on a dry basis and we have found that when an untreated yeast slurry is dried, as much as 60% of the glutathione may be destroyed, presumably by oxidation. The pH value of an average yeast slurry after disintegration of the cells we have found to be approximately 6.2 and we have found that the adjustment of the pH value of the yeast slurry may result in an increased stability of the glutathione in such a manner that the loss may be reduced to less than 5% in the drying process.

Our procedure for the determination of the pH of the dried product is to make a 5% suspension of the dried yeast and distilled water and measure the pH of the suspension after a digestion of one-half hour, using the Beckmann glass electrode apparatus. The pH of the slurry containing 15% solids is determined directly using the same instrument.

One method of adjusting the pH value of the yeast slurry is by the addition and mixing of preferably about 5 milliliters of concentrated sulfuric acid per gallon of slurry in the tank. This amount of acid reduces the pH value of the suspension of disintegrated cells to approximately 4.5 and at this pH there is little loss of glutathione in the drying. After the pH of the slurry in the tank is adjusted to the preferred range, the slurry is preheated, dried and pulverized as above described, the yeast cell walls being ruptured in the process.

In instances where the yeast cells are not disintegrated or the cell walls broken at the time of the addition of the acid, the pH will be decreased much more than in the case where the cell walls are disintegrated. However, we contemplate the addition of a suitable quantity of acid to provide the proper pH value in the dried product in which the cell walls are ruptured for the purpose of preserving the glutathione content of the product. The significant measurement of the pH of the slurry will be made after the cell constituents have been released into the solution.

An example of the prevention of the destruction of the glutathione by changes in the pH of the slurry before drying is illustrated in the following results:

| pH value of dried product | Per cent destruction |
|---|---|
| 3.1 | 12 |
| 4.3 | 13 |
| 5.0 | 15 |
| 5.6 | 25 |
| 6.0 | 27 |
| 6.8 | 37 |
| 7.6 | 41 |
| 8.6 | 51 |

As can be seen in the above illustration it is beneficial to lower the pH value to the slightest degree, however, we have found that a pH of 5 in the dried product is low enough to protect most of the glutathione and it is preferable in actual usage to have a pH range of approximately 4 to 5. At the latter range a drier and lighter colored product is also obtained than at higher pH values.

While the desired pH may be achieved by the addition of any organic or inorganic acid, we have found sulfuric acid to be satisfactory and preferable for our purpose because of the cheapness of this acid.

We have found that in regard to the retention of the glutathione in the dried product, the moisture content is a factor of great importance. We have found that, as a matter of practice, the moisture content of the dried yeast product should not exceed 6½%.

Samples of the dried yeast product having identical moisture levels show that those having the lowest pH value have the smallest rate of deterioration.

The adjustment of the pH value of the yeast slurry to a range of 4 to 5 permits higher preheating temperatures and substantially reduces the loss or destruction of the glutathione content of the yeast during the drying process, however, it is preferable that the temperature be kept as low as is possible to preserve the maximum amount of glutathione.

If desirable, vacuum may be used during the drying process to permit the use of satisfactory low drying temperatures to prevent destruction of the glutathione. After the dried brewer's yeast product is formed, the moisture content should be controlled and maintained at less than 6½% by weight during storage to achieve the best results and maintain a high normal glutathione content.

While we have described our method of processing the yeast and preserving the glutathione content in one form, it will be apparent that it is susceptible to changes and modifications without departing from the spirit of our invention and such modifications are contemplated as falling within the scope of the appended claims.

What we claim and desire to secure by Letters Patent is:

1. A product of the character described consisting of dried yeast with a moisture content of not more than 6½%, having ruptured cell walls, containing released yeast cell constituents including glutathione, and having a pH value in the range of approximately 4 to 5.

2. A product comprising a dried mixture of brewer's yeast with a moisture content of not more than 6½%, having ruptured cell walls, containing released yeast cell constituents including glutathione, and acid in which the pH value of the mixture is less than 6.

3. A product characterized by the stability of glutathione contained therein, and comprising dried yeast having ruptured cell walls and released yeast cell constituents, and containing not more than 6½% moisture by weight and having a pH value in the range of approximately 4 to 6.

4. A product characterized by the stability of glutathione contained therein, comprising dried yeast having ruptured cell walls and released yeast cell constituents, containing not more than 6½% moisture and having a pH value in the range of approximately 4 to 5.

5. A product of the character described consisting of brewer's yeast, having ruptured cell walls and released yeast cell constituents, containing glutathione, and sufficient acid in which the pH value thereof is less than 6 and which has a moisture content of not more than 6½% by weight.

6. The method of producing a dried yeast product having ruptured cell walls and characterized by the stability of available glutathione contained therein, consisting of adjusting the pH of said yeast to a range of approximately 4 to 5, and drying said yeast to reduce the moisture content to not more than 6%.

7. The method of producing a dried yeast product having ruptured cell walls and characterized by the stability of available glutathione contained therein, consisting of adjusting the pH of a brewer's yeast to less than 6, and reducing the moisture content of said yeast to a maximum of approximately 6½ percent by weight.

8. The method of producing a dried yeast product characterized by the stability of available glutathione contained therein, consisting of forming a yeast slurry, adding acid to said slurry to adjust the pH thereof to a maximum of 6, rupturing the cell walls to release the yeast cell constituents, and drying said yeast to reduce the moisture content to not more than 6%.

9. The method of producing a dried yeast product characterized by the stability of available glutathione contained therein, consisting of forming a yeast slurry, adding acid to said slurry to adjust the pH thereof to a maximum of 6, rupturing the cell walls to release the yeast cell constituents and reducing the moisture content of said yeast to a maximum of 6½ percent by weight.

10. The method of producing a dried yeast product characterized by the stability of available glutathione contained therein, consisting of forming a yeast slurry containining approximately 15% solids, adding acid to the slurry to adjust the pH thereof to a range of approximately 4 to 6, rupturing the cell walls to release the yeast cell constituents, preheating the yeast slurry, and reducing the moisture content of the yeast to a maximum of 6½ percent by weight.

11. The method of producing a dried yeast product characterized by the stability of available glutathione contained therein, consisting of forming a yeast slurry containing approximately 15% solids, adding acid to the slurry to adjust the pH thereof to a range of approximately 4 to 6, treating the yeast to rupture the cell walls and release the yeast cell constituents, preheating the yeast slurry, reducing the moisture content of the yeast to a maximum of 6½ percent by weight, and pulverizing said dried yeast.

12. A product of a dried mixture of brewer's yeast having ruptured cell walls and released yeast cell constituents, said mixture containing approximately 1% active glutathione, less than 6½% moisture, and having a pH value in the range of approximately 4 to 5.

ROLAND W. SELMAN, Jr.
HOMER S. MYERS.